Figure 3:
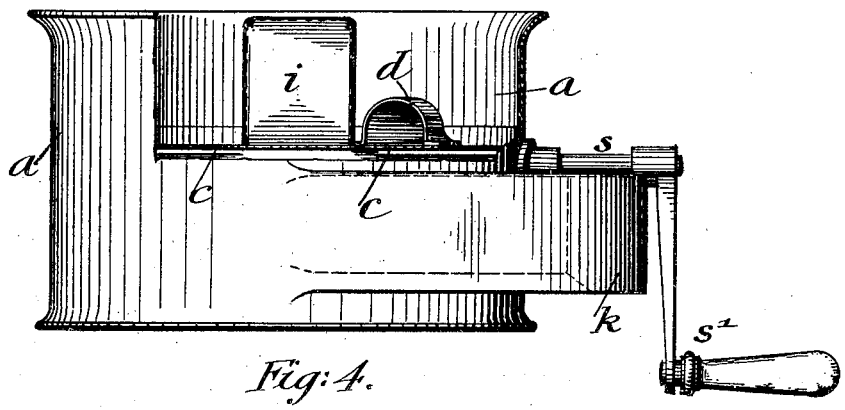

No. 770,038. PATENTED SEPT. 13, 1904.
E. BACH.
MACHINE FOR STRIPPING AND CRUSHING GRAPE BERRIES.
APPLICATION FILED APR. 27, 1904.
NO MODEL. 2 SHEETS—SHEET 1.
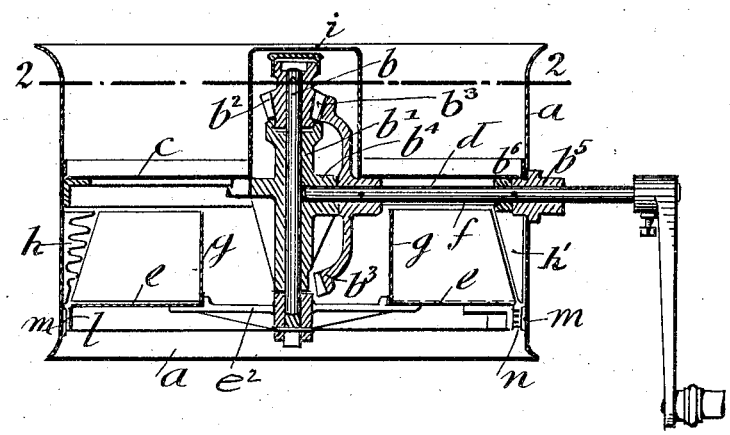
Fig: 1.
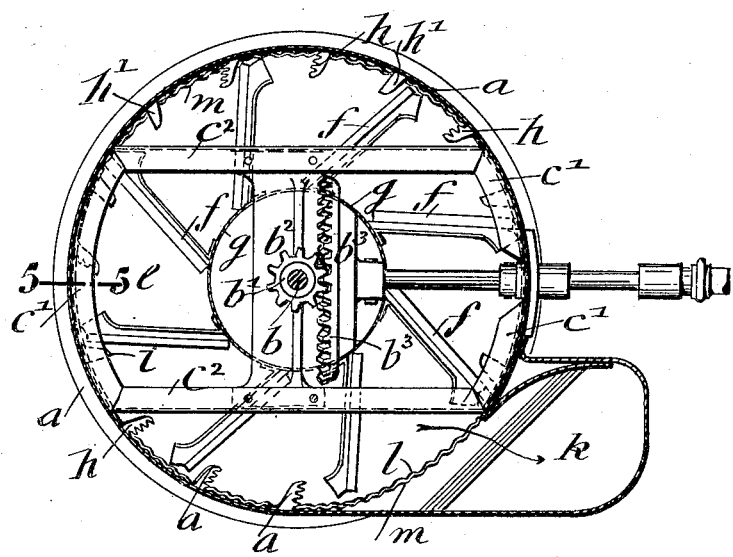
Fig: 2.
Witnesses
Inventor
Emil Bach
By his Attorneys No. 770,038. PATENTED SEPT. 13, 1904.
E. BACH.
MACHINE FOR STRIPPING AND CRUSHING GRAPE BERRIES.
APPLICATION FILED APR. 27, 1904.
NO MODEL. 2 SHEETS—SHEET 2.

No. 770,038. Patented September 13, 1904.

UNITED STATES PATENT OFFICE.

EMIL BACH, OF HEILBRONN, GERMANY.

MACHINE FOR STRIPPING AND CRUSHING GRAPE-BERRIES.

SPECIFICATION forming part of Letters Patent No. 770,038, dated September 13, 1904.

Application filed April 27, 1904. Serial No. 205,198. (No model.)

*To all whom it may concern:*

Be it known that I, EMIL BACH, a citizen of the Empire of Germany, residing in Heilbronn, in the Kingdom of Würtemberg and Empire of Germany, have invented certain new and useful Improvements in Machines for Stripping and Crushing Grape - Berries, of which the following is a specification.

In the machines for stripping grape-berries heretofore in use rotary stirrers are employed which are applied to a horizontal shaft and by which the berries are stripped and forced through a screen, while the combs are ejected from the machine. These machines have the disadvantage that the grapes fed to the machine have to be taken hold of by the rotating stirrers during the dropping in of the same and that they have to be acted upon for a sufficient distance by the stirrers for properly stripping off the berries. Furthermore, the stirrers have to be rotated at considerable speed, for as soon as the speed is decreased the grapes are dropped through between the stirrers and the berries moved only in an imperfect manner from the combs during the short time in which the grapes are subjected to the action of the stirrers. Another disadvantage of the machines heretofore in use is that they possess a certain degree of instability, owing to the fact that the moving masses are arranged at some distance above the screen. These disadvantages have prevented the more general introduction of these grape stripping and crushing machines.

The object of this invention is to furnish a machine by which the objections referred to are obviated and the stripping off of the grape-berries from their combs and the crushing of the former is accomplished in a more effective and reliable manner; and for this purpose the invention consists of a machine for stripping and crushing grape - berries which comprises a cylindrical casing provided with inwardly-projecting ledges, a rotary platform having upright vanes inclined at their outer edges, and means for ejecting the combs.

The invention consists, further, of a grape stripping and crushing machine in which the berries after being stripped from their combs are passed through a circumferential space formed between the corrugated circumferential flange of the platform and a stationary corrugated ring at the lower part of the casing, so that the berries are delivered in crushed condition at the lower circumference of the casing; and the invention consists, lastly, of a machine for stripping and crushing grape-berries in which the rotating platform is provided below its corrugated circumferential flange with brushes that move over the corrugated rim of the casing for assisting in crushing the berries and removing them from the space between the corrugated circumference of the platform and the corrugated ring on the casing.

Figure 4:
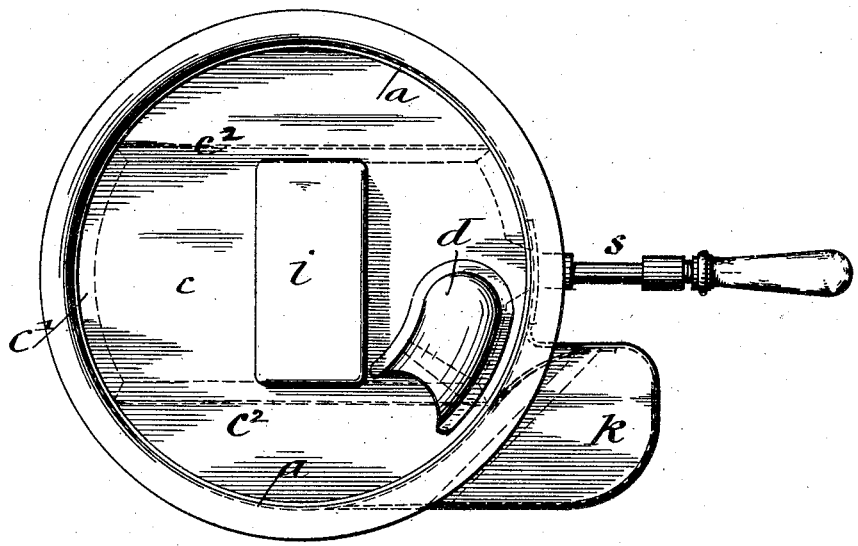

In the accompanying drawings, Figure 1 represents a vertical central section of my improved machine for removing grape-berries from their combs. Fig. 2 is a plan view, partly in horizontal section, on line 2 2, Fig. 1. Fig. 3 is a side elevation of Fig. 1 with a portion of the upper part of the casing broken off. Fig. 4 is a plan view of Fig. 3; and Figs. 5 and 6 are detail vertical sections through the lower part of the casing and platform on line 5 5, Fig. 2, showing the brushes at the circumference of the platform for crushing the berries and removing them from the corrugated rim of the casing.

Similar letters of reference indicate corresponding parts.

Referring to the drawings, $a$ represents a cylindrical casing which is divided by a horizontal partition $c$ into an upper and a lower compartment. The partition $c$ is supported on arc-shaped angle-irons $c'$, attached to the interior of the casing, and transverse angle-irons $c^2$, connecting the ends of the arc-shaped angle-irons $c'$. (Shown in Figs. 1 and 2.) The upper compartment of the casing serves for receiving the grapes to be stripped and crushed and is connected by an opening $o$ in the partition $c$ with the lower compartment. The opening $o$ is covered by a hood $d$. In the lower compartment is arranged a rotary ring-shaped platform $e$, to which are attached by angle-irons upright vanes $f$, that extend at a slight angle of inclination to the vertical axis of the casing toward the casing $a$, said vanes being provided with inclined serrated or toothed edges, as shown in Fig. 5. The platform $e$ is supported on a disk-shaped center portion $e^2$, the hub of which is keyed to an upright shaft $b$, that is supported in suitable step and neck bearings of a tubular center post $b'$, said shaft receiving rotary motion by a bevel-gear transmission $b^2$ $b^3$ from a shaft $s$, the inner end of which turns in journal-bearings $b^4$ on said center post and the outer end of which turns in journal-bearings $b^5$ on the casing $a$, as shown in Fig. 1. A collar $b^6$ on the shaft $s$ holds the same in position in the bearings $b^4$ $b^5$. The horizontal shaft $s$ is provided with a crank-handle $s'$ at its outer end for rotating the shaft $s$ and imparting by the bevel-gear transmission $b^3$ $b^2$ rotary motion to the ring-shaped platform $e$. The bevel-gears $b^3$ $b^2$ are inclosed by a sheet-metal cover or hood $i$. (Shown in Figs. 1 and 3.) The interior cylinder $g$ is made concentric with the casing $a$ and forms, with the movable vanes supported on the platform $e$, pockets into which the grapes are dropped and in which they are moved by centrifugal force in outward direction toward the circumference of the casing $a$. To the lower inside portion of the casing $a$ are attached stationary toothed ledges $h$ or alternate toothed and straight ledges $h'$, as shown in Figs. 2 and 5. Both the ledges $h$ and $h'$ are arranged at their inner edges with the same inclination as the outer edges of the vanes $f$, so that the vanes can readily pass the ledges without interference. They serve for the purpose of removing or stripping the berries from their combs, which latter are driven in outward direction through an opening in the circumference of the casing onto and over a chute $k$, from which the combs are dropped into a suitable receptacle. The berries are conducted from the circumference of the rotary platform $e$ through a narrow annular space formed between the corrugated circumferential flange $l$ of the platform $e$ and a corrugated ring $m$, attached concentrically with the flange $l$ to the lower part of the casing, so as to be crushed by the joint action of the corrugated flange $l$ and ring $m$.

Figure 5:
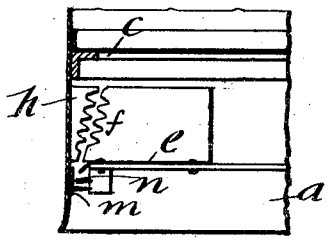
Figure 6:
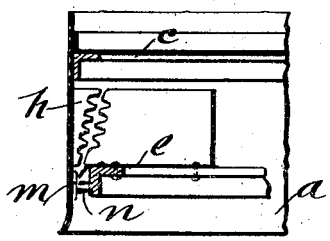

For the purpose of increasing the crushing and squeezing action on the berries and also for removing the skins adhering to the corrugated ring $m$ radial brushes $n$ are arranged on a rim at the under side of the platform $e$ below the corrugated flange $l$, as shown in Figs. 5 and 6, said brushes being made almost as high as the corrugated ring $m$ of the casing, so that one or more brushes can be arranged thereon, which sweep over the corrugations of the ring $m$. The brushes can be made of ordinary bristles or metallic bristles and can be so arranged as to be adjustable from time to time as the bristles are gradually worn off. By the stripping action of the vanes and toothed ledges on the grapes and the crushing action of the corrugated circumferential flange of the platform and the corrugated ring on the casing and by the action of the brushes on the platform the berries are delivered in a perfectly-crushed and opened-up condition into the vat on which the machine is supported, while the combs are conducted off over the chute $k$.

In the improved machine hereinbefore described the grapes are subjected to a stripping and crushing action for nearly three-quarters of the circumference of the casing, while with the machines heretofore in use only one-half the circumference of the casing can be utilized for stripping and crushing the berries.

The machine can be operated by one attendant, who turns the crank and supplies the required quantity of grapes to be stripped and crushed, or it can be operated by a belt-and-pulley transmission applied to the driving-shaft $s$, as desired.

Having thus described my invention, I claim as new and desire to secure by Letters Patent—

1. A grape stripping and crushing machine, consisting of a cylindrical casing, means for feeding the grapes in the upper part of the casing, a rotary ring-shaped platform in the lower part of the same, upright vanes supported on said platform and extending toward the circumference of the casing, said vanes being provided with inclined outer edges, stationary ledges on the inner circumference of the casing having inclined edges corresponding to the edges of the vanes, and a chute connected with an opening in the circumference of the casing for ejecting the stripped combs, substantially as set forth.

2. A grape stripping and crushing machine, consisting of a cylindrical casing, means for feeding the grapes located in the upper part of the casing, a rotary ring-shaped platform in the lower part of the same, upright vanes supported on said platform and extending toward the circumference of the casing, said vanes being provided alternately with inclined and toothed edges, stationary inclined and toothed ledges on the inner circumference of the casing adjacent to the inclined edges of the vanes, and a chute connected with an opening in the circumference of the casing for ejecting the stripped combs, substantially as set forth.

3. In a machine for stripping and crushing grapes, the combination with a casing having inwardly-projecting upright ledges, of a rotary platform provided with upright vanes cooperating with said ledges, a corrugated flange depending from the circumference of said platform, a corrugated ring fixed to said casing below said ledges and coöperating with said corrugated flange, and means for feeding the grapes to said platform, substantially as set forth.

4. In a machine for stripping and crushing grapes, the combination, with a casing having inwardly-projecting upright ledges, of a rotary platform provided with upright vanes, means for feeding the grapes to said platform, a corrugated flange at the circumference of the platform, brushes attached to the under side of the platform below the corrugated flange, and a stationary corrugated ring at the lower part of the casing encircling said flange and brushes, substantially as set forth.

In testimony that I claim the foregoing as my invention I have signed my name in presence of two subscribing witnesses.

EMIL BACH.

Witnesses:
SIEGFRED FELS,
ERNST ENTENMAN.